United States Patent [19]

Shimazaki et al.

[11] 4,087,101
[45] May 2, 1978

[54] INDUSTRIAL VEHICLE FRAME WITH INTERNAL, STRUCTURALLY REINFORCING FUEL AND HYDRAULIC FLUID TANKS

[75] Inventors: Akio Shimazaki; Osamu Kambe, both of Osaka, Japan

[73] Assignee: Toyo Umpanki Co., Ltd., Osaka, Japan

[21] Appl. No.: 736,016

[22] Filed: Oct. 27, 1976

[30] Foreign Application Priority Data

Jan. 12, 1976 Japan ............................... 51-2375[U]

[51] Int. Cl.² ............................................. B62D 25/00
[52] U.S. Cl. .................................................... 280/5 A
[58] Field of Search ................ 280/5 R, 5 A, 106 T; 296/1 C; 180/51

[56] References Cited

U.S. PATENT DOCUMENTS

| 1,789,238 | 1/1931 | Lancia | 280/5 A X |
| 2,535,301 | 12/1950 | Tourneau | 280/5 R |
| 2,725,223 | 11/1955 | McCallum | 280/5 R X |
| 2,822,056 | 2/1958 | Muller | 280/5 A X |
| 3,437,163 | 4/1969 | Lemmerman | 180/51 |
| 3,880,445 | 4/1975 | Chieger | 280/5 A X |

*Primary Examiner*—Joseph F. Peters, Jr.
*Assistant Examiner*—R. Schrecengost
*Attorney, Agent, or Firm*—Sughrue, Rothwell, Mion, Zinn and Macpeak

[57] ABSTRACT

A frame assembly for a tractor shovel or the like includes a front frame and a rear frame having generally U-shaped cross-sections. The frames are pivotally joined by a vertical shaft. A rectangular parallelopiped hydraulic fluid tank is internally mounted in the front frame, and its side and front edges are secured by welding or the like to the front frame plates. Similarly, a rectangular parallelopiped fuel tank is internally mounted in the rear frame, and its side and rear edges are welded or the like to the rear frame plates. The arrangement offers increased frame strength and rigidity with no increase in weight, and the tanks are better protected by reason of their internal mountings.

4 Claims, 4 Drawing Figures

INDUSTRIAL VEHICLE FRAME WITH INTERNAL, STRUCTURALLY REINFORCING FUEL AND HYDRAULIC FLUID TANKS

BACKGROUND OF THE INVENTION

This invention relates to an improved frame and storage tank construction for industrial vehicles, such as tractor shovels.

In the prior art types of tractor shovels shown in FIG. 1, the front frame 52 and the rear frame 53 are coupled through a vertical shaft around which the frames can mutally pivot. An engine is installed at 54 in the rear part of the rear frame 53. An engine fuel tank 55 is externally mounted in front of the left rear tire 56 on the outside of the left side plate 57 of the rear frame. A hydraulic fluid tank (not shown) for the hydraulic pressure cylinders 59 of a shovel 58 is located at a position symmetrical to that of the fuel tank 55, that is, in front of the right rear tire and on the outside of the right side plate of the rear frame.

Accordingly, in such a conventional frame construction the two tanks do not contribute to the rigidity of the frame assembly, which rigidity cannot be increased without increasing the thickness of the plates of the frame assembly. Therefore, the conventional frame construction is disadvantageous in that its cost is high and its weight is heavy, and substantial tank installation work is unavoidably required in the frame assembly process.

SUMMARY OF THE INVENTION

Accordingly, an object of this invention is to eliminate all of the above-described disadvantages of the prior art by providing a pivotally joined frame assembly in which the front and rear end frame portions have U-shaped cross-sections, a substantially rectangular parallelopiped fuel tank being internally fitted in the rear end portion and integrally secured thereto by welding, bolts, or the like, and a substantially rectangular parallelopiped hydraulic fluid tank being internally fitted in the front end portion and similarly integrally secured thereto.

DETAILED DESCRIPTION OF THE PREFERRED EMBODIMENT

Figure 1:
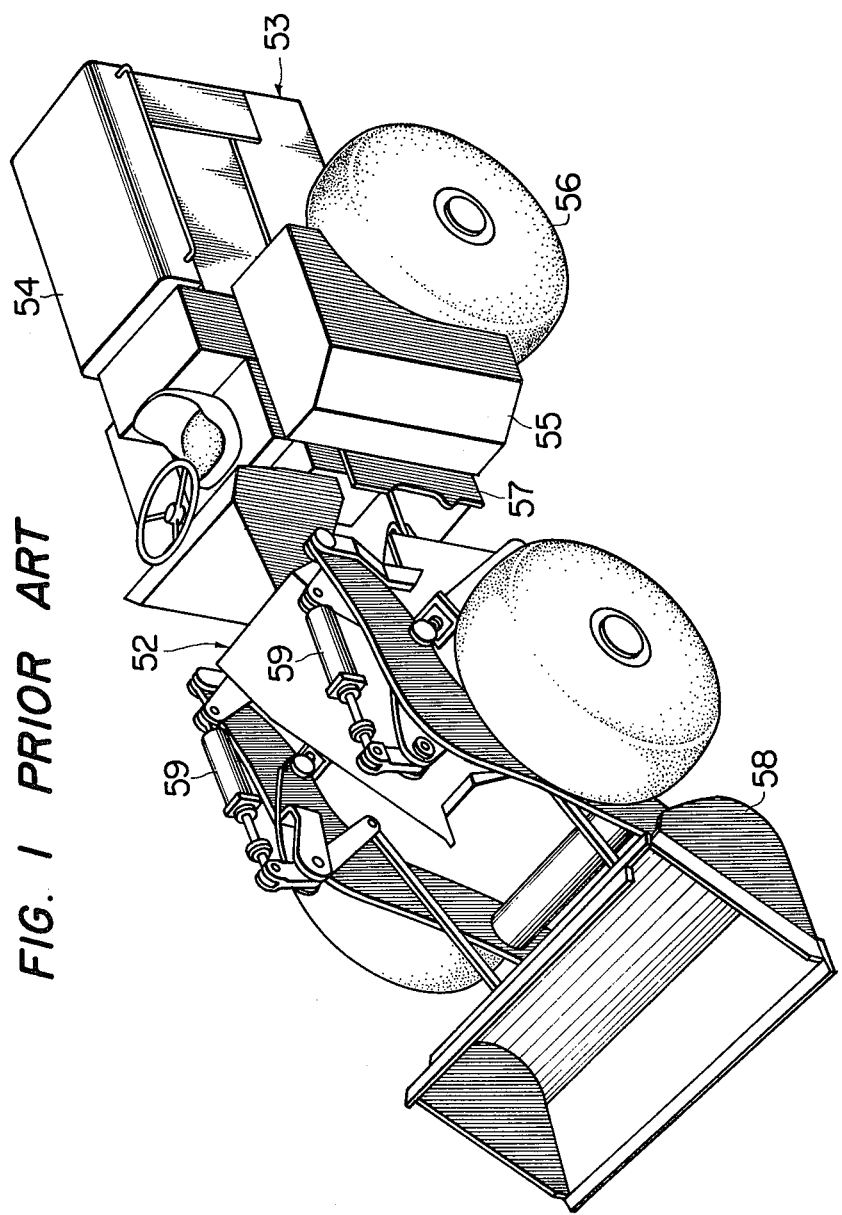
FIG. 1 shows a perspective view illustrating a conventional tractor shovel.
Figure 2:
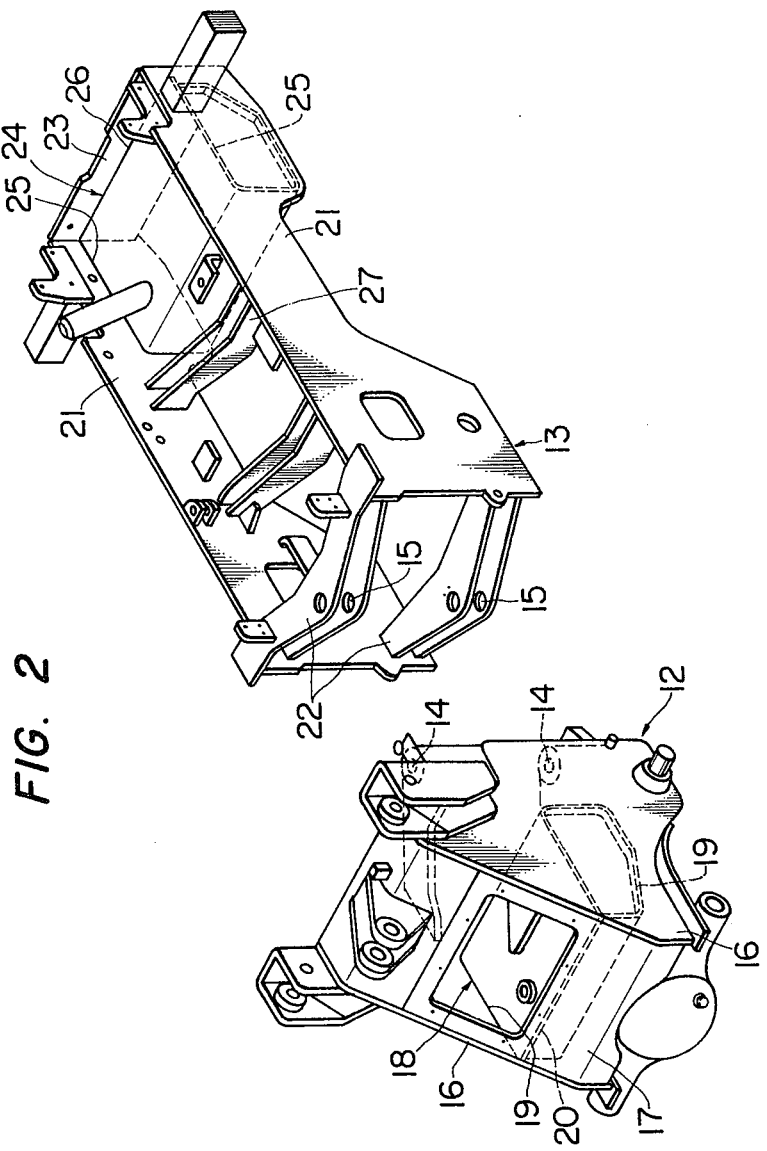
FIG. 2 shows a perspective, exploded view illustrating a frame assembly of a tractor shovel in accordance with this invention.
Figure 4:
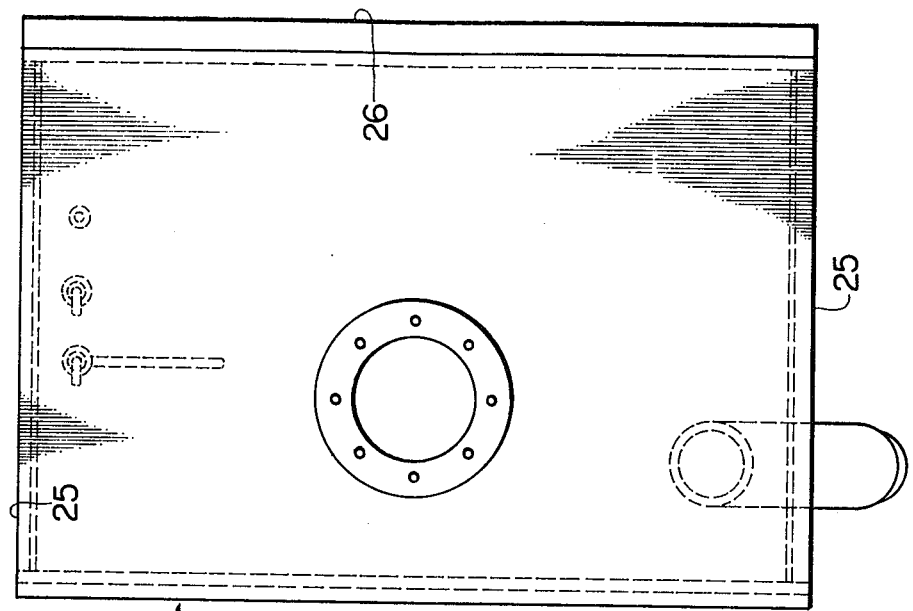
FIG. 4 shows a bottom view of the fuel tank shown in FIG. 3.
Figure 3:
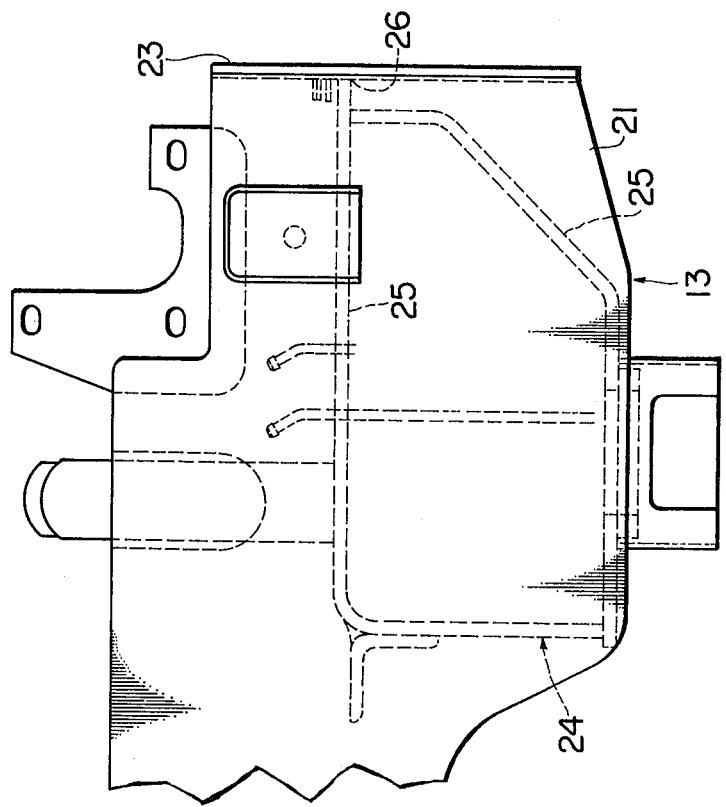
FIG. 3 shows a side view illustrating the rear end part of the frame assembly of FIG. 2

A preferred embodiment of this invention, applied to a tire type of tractor shovel, will be described with reference to FIGS. 2, 3 and 4. In FIG. 2, reference numerals 12 and 13 designate a front frame and a rear frame, respectively. A vertical shaft (not shown) is inserted through bearing members 14 at the rear end of the front frame 12 and bearing members 15 at the front end of the rear frame 13, to thereby form a pivotal frame assembly. The front frame 12 comprises right and left side plates 16, a front plate 17, and a rear plate (not shown), and has a substantially rectangular plan-section. A substantially rectangular parallelopiped hydraulic fluid tank 18 is internally mounted in the frontmost part of the front frame 12. The right and left edges 19 and the upper front edge 20 of the tank 18 are integrally secured to the side plates 16 and the front plate 17, respectively, by welding or with bolts, rivets, or the like.

The rear frame 13 is constituted by right and left side plates 21, front brakets 22, and a rear plate 23, and also has a generally rectangular plan view. A substantially rectangular parallelopiped fuel tank 24 is internally mounted in the rearmost end part of the rear frame 13. The right and left edges 25 and the upper rear edge 26 of the fuel tank are integrally secured to the side plates 21 and rear plate 23, respectively, by welding or with bolts, rivets, or the like. The engine is supported by cross-members 27 immediately in front of the fuel tank 24.

As is apparent from the above description, the hydraulic fluid tank and the fuel tank, both of which are substantially rectangular parallelopiped in shape, are integrally fixed within the front and rear frames, respectively, and each of these tanks has a section modulus greater than that of an individual cross-member. Accordingly, these tanks contribute greatly to the rigidity of the frame, which is thereby strengthened without any increase in weight. Furthermore, costly and involved tank installations are eliminated from the assembling process. In addition, since the tanks are integrally built into their respective frames, the resulting frame assemblies are more compact and the tanks are better protected from damage, as by stones thrown up by the tires. As the fuel tank is located at the rear end of the vehicle, its stability when handling a heavy load at the front or shovel end is greatly improved. Furthermore, as the hydraulic fluid tank is located near the shovel cylinders and the fuel tank is located near the engine, the piping for these tanks is simplified.

What is claimed is:

1. In an industrial vehicle including a front frame (12) and a rear frame (13) adapted to be pivotally joined by a vertical shaft extending through bearing members (14, 15), the improvements characterized by:
    (a) the front and rear frames having generally U-shaped sections,
    (b) the front frame comprising a pair of opposed side plates (16) and a front plate (17) joined thereto,
    (c) a substantially rectangular parallelopiped fuel tank (24) internally mounted in the rear frame, extending thereacross, and securely fastened thereto, and
    (d) a substantially rectangular parallelopiped hydraulic fluid tank (18) internally mounted in the front frame, and extending thereacross,
    (e) the side edges (19) and the upper front edge (20) of the hydraulic fluid tank being rigidly secured to the side plates and the front plate, respectively, whereby said tanks structurally reinforce and increase the rigidity of their respective frames.

2. An industrial vehicle as defined in claim 1 wherein:
    (a) the rear frame comprises a pair of opposed side plates (21) and a rear plate (23) joined thereto, and
    (b) the side edges (25) and the upper rear edge (26) of the fuel tank are rigidly secured to the side plates and the rear plate, respectively.

3. An industrial vehicle as defined in claim 2 wherein the edges (19, 20, 25, 26) of the tanks comprise flanges extending outwardly from the bodies of the tanks, and wherein the plates (16, 17, 21, 23) are substantially planar.

4. In an industrial vehicle including a front frame (12) and a rear frame (13) adapted to be pivotally joined by a vertical shaft extending through bearing members (14, 15), the improvements characterized by:
  (a) the front and rear frames having generally U-shaped sections,
  (b) the rear frame comprising a pair of opposed side plates (21) and a rear plate (23) joined thereto,
  (c) a substantially rectangular parallelopiped fuel tank (24) internally mounted in the rear frame, and extending thereacross,
  (d) the side edges (25) and the upper rear edge (26) of the fuel tank being rigidly secured to the side plates and the rear plate, respectively, and
  (e) a substantially rectangular parallelopiped hydraulic fluid tank (18) internally mounted in the front frame, extending thereacross, and securely fastened thereto, whereby said tanks structurally reinforce and increase the rigidity of their respective frames.

* * * * *